United States Patent [19]

Mizuta et al.

[11] Patent Number: 4,628,234
[45] Date of Patent: Dec. 9, 1986

[54] SAFETY DEVICE FOR AUTOMATIC WINDOW REGULATOR

[75] Inventors: Ken Mizuta, Miyagi; Shiro Kondo, Furukawa, both of Japan

[73] Assignee: Alps Electric Co., Ltd., Japan

[21] Appl. No.: 765,607

[22] Filed: Aug. 14, 1985

[30] Foreign Application Priority Data

Aug. 14, 1984 [JP] Japan .................. 59-168872

[51] Int. Cl.⁴ .............................. H02P 1/22
[52] U.S. Cl. .................... 318/267; 318/264; 318/286; 318/469; 318/484
[58] Field of Search ............ 318/256, 264, 265, 266, 318/267, 280, 282, 283, 285, 286, 484, 469

[56] References Cited

U.S. PATENT DOCUMENTS

| | | | |
|---|---|---|---|
| 4,001,661 | 1/1977 | Terabayashi | 318/264 |
| 4,272,708 | 6/1981 | Carle et al. | 318/286 X |
| 4,394,605 | 7/1983 | Terazawa | 318/291 X |
| 4,468,596 | 8/1984 | Kinzl et al. | 318/287 |

FOREIGN PATENT DOCUMENTS 53-10727 4/1978 Japan .
54-42130 12/1979 Japan .

Primary Examiner—William M. Shoop, Jr.
Assistant Examiner—Bentsu Ro
Attorney, Agent, or Firm—Guy W. Shoup

[57] ABSTRACT

A window regulator device for automatically elevating or lowering a window glass of an automobile is equipped with a safety device that operates when a human arm, for example, is sandwiched between the glass and its window frame. The regulator device consists of a motor for moving the glass up or down, a detector circuit for sensing whether the motor is locked, a reversing circuit connected to the detector circuit for reversing the motor, a latching circuit for maintaining the motor energized, and an operated switch for permitting the motor to move the glass up or down.

4 Claims, 5 Drawing Figures

SAFETY DEVICE FOR AUTOMATIC WINDOW REGULATOR

FIELD OF THE INVENTION

The present invention relates to a device for automatically regulating an automotive window glass, for example, and, more particularly, to an automatic window regulator device equipped with a safety device that is made operative when a foreign object is held between a window glass and its window frame while the glass is moving.

BACKGROUND OF THE INVENTION

For ordinary automobiles, a window glass can be moved up or down by rotating a window regulator handle. In an attempt to eliminate this cumbersome rotating operation, various automatic, or motor-driven, window regulator devices have been recently discussed, and some of them have been put into practical use.

A kind of such automatic window regulator devices has been disclosed in Japanese Patent Publication No. 42130/1979. FIG. 5 is an electric circuit diagram of this disclosed device, which is shown to have a battery 1 installed in an automobile, an ignition switch 2, a brush-shifting reversible motor 3, a movable switching element 4, a contact 5 for manual operation to lower a window, a contact 6 for one-touch operation to lower the window, a contact 7 for manual operation to elevate the window, a contact 8 for one-touch operation to elevate the window, a control circuit 9 for controlling the rotation of the motor 3, a holding circuit 10 for the lowering operation, a holding circuit 11 for the elevating operation, a voltage detector circuit 12, a relay 13 for the lowering operation, and a relay 14 for the elevating operation.

In the prior art electric circuit described above, when the contact 8 is contacted momentarily, a signal is produced to bring a transistor $Tr_4$ into conduction and, at the same time, to cause another transistor $Tr_3$ to conduct. Thus, a relay coil $L_2$ is energized via a relay contact $P_2$. This condition of energization is maintained by the circuit, so that the motor 3 is also kept energized, thereby gradually elevating a window glass (not shown) until it bears on the window frame or a foreign object is held between the glass and the frame, in which case the rotational frequency changes. This change is detected by the detector circuit 12, and the resulting signal carries the transistor $Tr_4$ out of conduction. Simultaneously, the transistor $Tr_3$ also ceases to conduct. Then, the coil $L_2$ is deenergized to thereby stop the motor 3.

If the one-touch contact 8 for elevating operation should be held closed for some reason or other, then the relay coil $L_2$ will be maintained energized by the battery 1 via the movable element 4 and the contact 8. Under this condition, the motor 3 keeps rotating whether the voltage detector circuit 12 delivers the aforementioned output signal or not. Especially, when the neck or an arm of a person is sandwiched between the window glass and the frame, a dangerous situation takes place. Similar condition will arise when the contact 7 for manual operation to elevate the window is kept closed. In this way, a satisfactory safety means is not incorporated in the system.

SUMMARY OF THE INVENTION

It is the object of the present invention to provide a safe, automatic window regulator device which is free of the foregoing drawbacks with the prior art device.

This object is achieved by an automatic window regular device comprising: an electric motor for elevating or lowering a window glass; switch control section for selecting between upward and downward movements of the motor; a detector means for detecting the condition in which a foreign object has been sandwiched between the glass and its window frame during upward movement of the glass; and a means for reversing or stopping the motor according to the output signal from the detector means even when the switch is maintained operative.

DETAILED DESCRIPTION OF THE INVENTION

Figure 2:
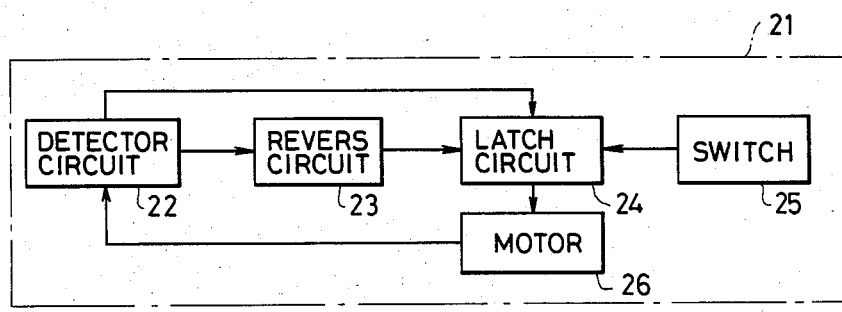
FIG. 2 is a block diagram of the whole regulator device of FIG. 1.

Referring to FIG. 2, an automatic window regulator device embodying the concept of the present invention is schematically shown. This regulator device 21 consists principally of a detector circuit 22, a reversing circuit 23, a latching circuit 24, an operated switch 25, and an electric motor 26. These components are interconnected as shown. The functions of the circuits are next briefly described individually.

Switch Control Section 25

Figure 1:
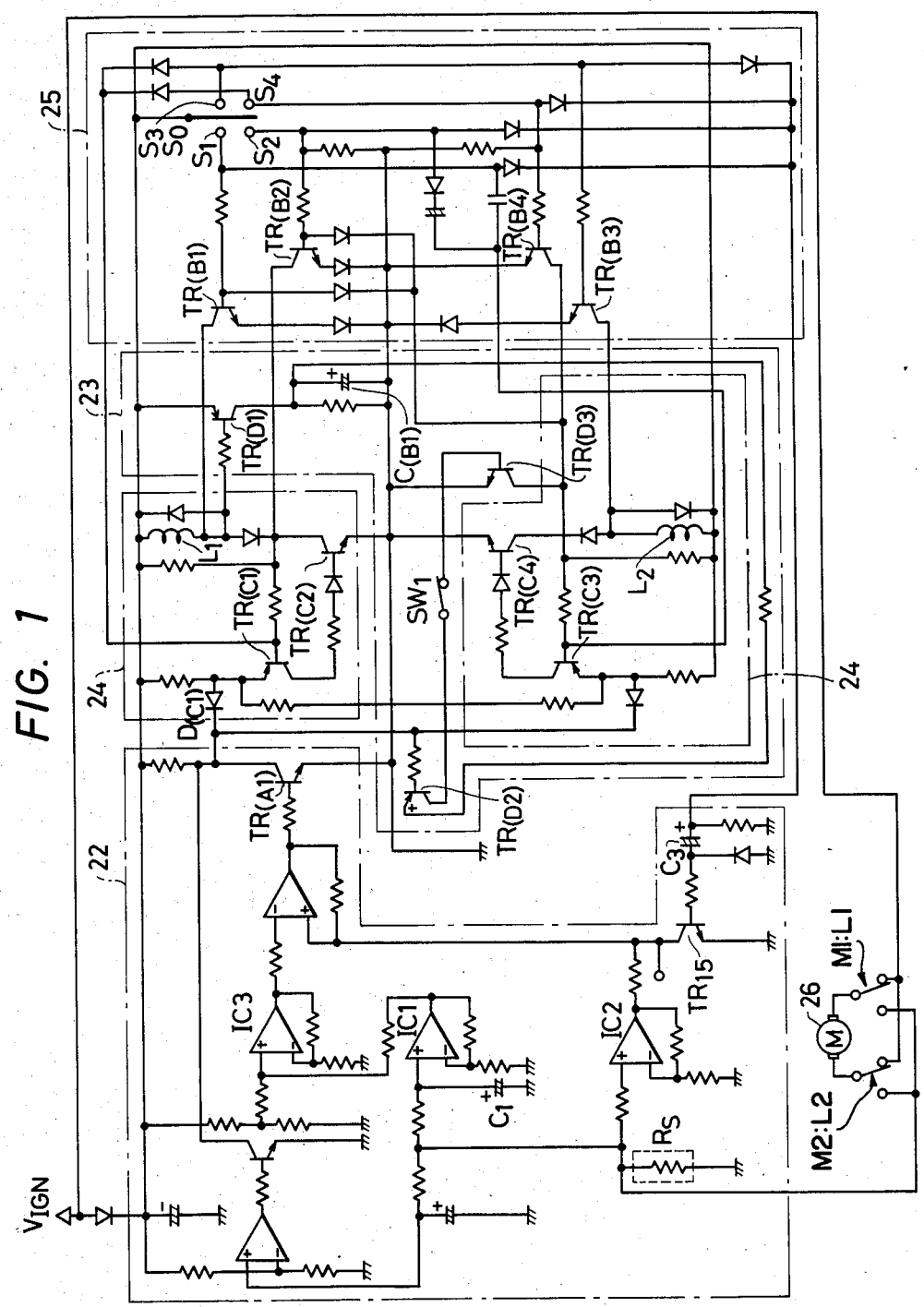
FIG. 1 is an electric circuit diagram of an automatic window regulator device according to the present invention.

A switch for selecting a manual-up, manual-down, auto-up, or auto-down mode for the window glass has a common contact point $S_0$, manual-up and -down contacts $S_1$ and $S_3$, and auto-up and -down contacts $S_2$ and $S_4$, as shown in FIG. 1. This switch includes further a movable contact which is always connected electrically with the common point $S_0$.

The movable contact is coupled to a lever (not shown) which is operated, for example, by a finger in the various modes of the window glass desired. However, it is not necessary to limit this switch to the lever type, as a push-button type, slide-button type, and the like can also be adopted to realize the same function. By means of this switch control section 25, the motor 26 is rotated to close or open (move up or down) the window glass only for the time interval during which the common contact $S_0$ is connected electrically with the manual-up contact $S_1$, the manual-down contact $S_3$, the auto-up contact $S_2$, or the auto-down contact $S_4$.

Detector Circuit 22

When the window glass is moving upward but does not yet reach the window frame, if a hand, neck, or the like is sandwiched between the glass and the frame, this circuit 22 functions to correctly detect this condition.

The structure and the operation will be described in detail later.

Reversing Circuit 23

If a hand or other body portion is held between the glass and the frame during upward movement of the glass as stated above, the signal delivered from the detector circuit 22 is applied to this circuit 23, which then causes the latching circuit 24 to unlatch. Thus, the motor 26 is either stopped or reversed to lower the glass until it reaches the lowermost position, whereupon the motor 26 is stopped.

The detection whether or not the window glass has reached the upper portion of the frame is performed by a position detection switch SW1 (see FIG. 1) which is kept in a closed state until he window glass reaches the upper portion of the frame. Specifically, if an output signal (a detection signal) is given from the detector circuit 22 while the position detector switch SW1 is closed, the AND of these two conditions results in application of the signal to the reversing circuit 23 which reverses rotation of the motor 26 to lower the window glass. On the other hand, when the window glass reaches the upper portion of the frame, the position detector switch SW1 is opened, a detection signal is not applied to the reversing circuit 23, and the rotation of the motor 26 is merely stopped. To achieve the foregoing function, the position detector switch SW1 is preferably disposed in the path of the window glass in the vicinity of the upper portion of the frame.

Latching Circuit 24

When one or more pulses are applied to this circuit 24 from the auto-up contact $S_2$ or the auto-down contact $S_4$, this circuit 24 acts to maintain the motor 26 energized. However, when the motor 26 is locked and the detector circuit 22 is made operative as mentioned previously, this circuit 24 immediately deenergizes the motor.

Detailed Description of the Circuits

Figure 3:
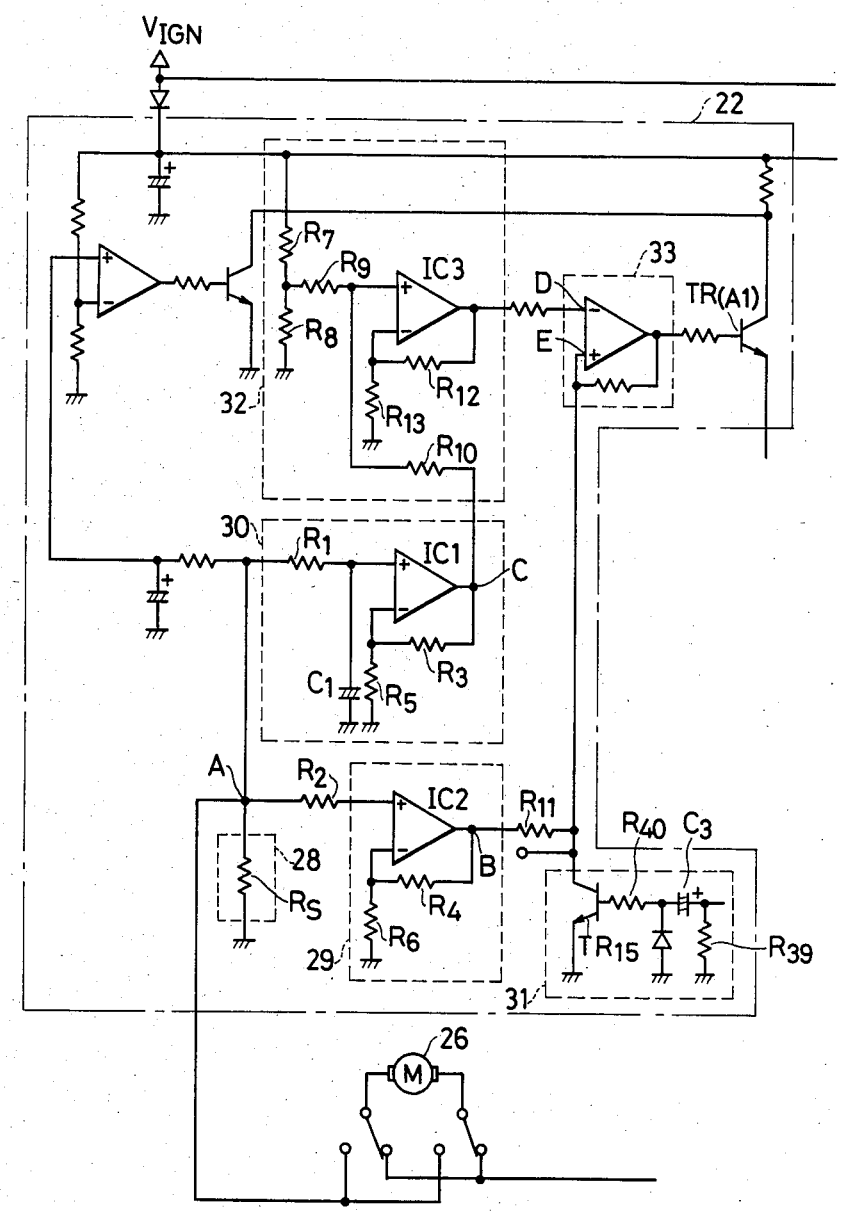
FIG. 3 is an electric circuit diagram of the detector circuit incorporated in the device shown in FIG. 1.

The structure of the detector circuit 22 is now described in greater detail by referring to FIG. 3. This circuit 22 is composed mainly of a motor waveform sensor 28, a real-time amplifier circuit 29, a delay amplifier circuit 30, a starting voltage canceling circuit 31, a non-inverting adder/amplifier circuit 32, and a comparator 33.

Figure 4:
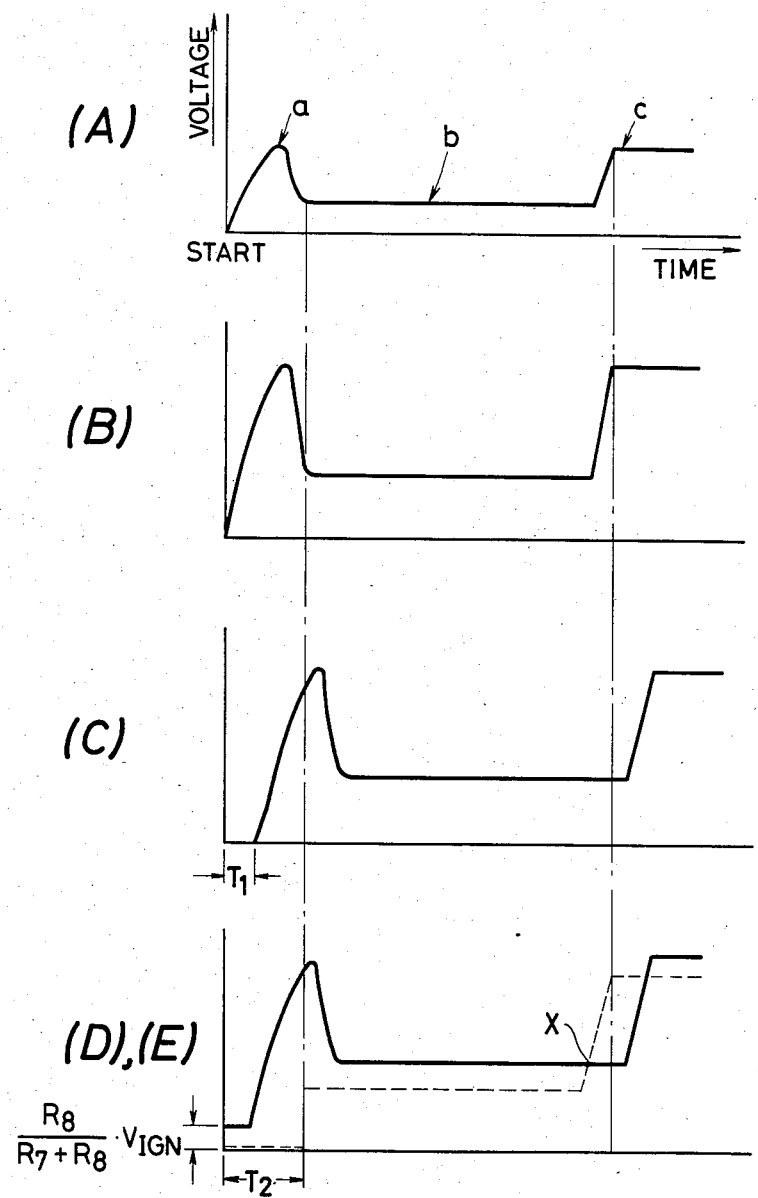
FIG. 4 is a waveform diagram of the voltages appearing at various locations in the detector circuit shown in FIG. 3 when the motor is energized.
Figure 5:
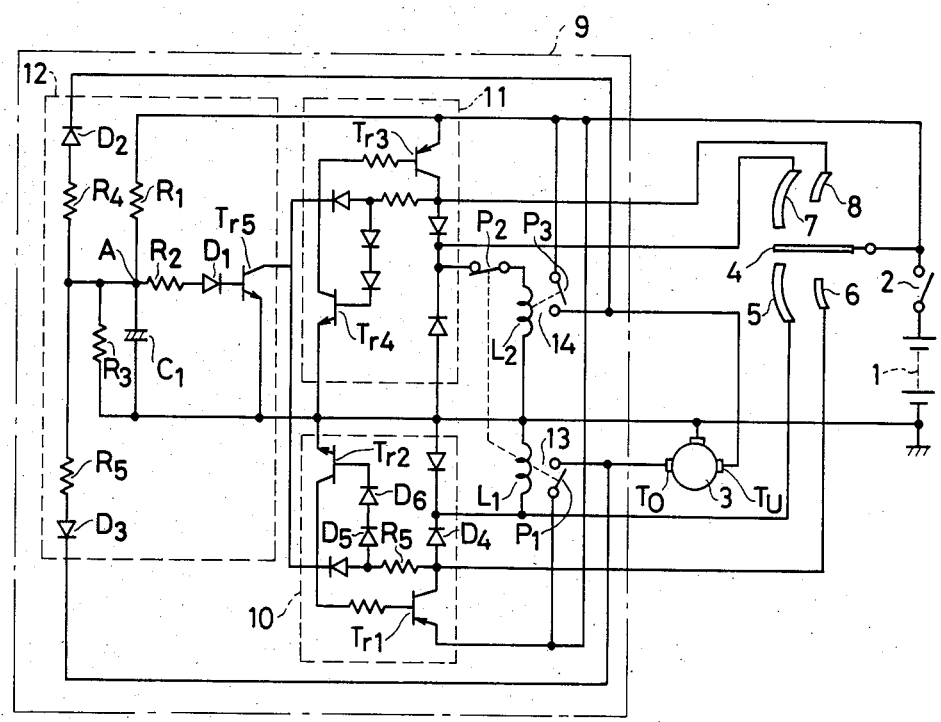
FIG. 5 is an electric circuit diagram of a conventional automatic window regulator device.

The motor waveform sensor 28 consists of a resistor RS that converts the current energizing the motor 26 into a corresponding voltage. The voltage waveform obtained from the output terminal A is shown in FIG. 4(A). The portion a of the waveform indicates the start of the motor, the portion b indicates the steady operating condition, and the portion c indicates the condition in which the motor is locked when a foreign object is sandwiched.

The real-time amplifier circuit 29 amplifies the voltage obtained by the resistor RS by a factor of $(1+R4/R6)$. The output waveform from the circuit 29 is shown in FIG. 4(B).

The delay amplifier circuit 30 delays the voltage obtained by the resistor RS by a period of time $T_1$ determined by a capacitor C1 and a resistor R1, and amplifies the delayed signal by a factor of $(1+R3/R5)$. The output waveform from the delay amplifier circuit 30 is shown in FIG. 4(C).

The starting voltage canceling circuit 31 causes a transistor TR15 to conduct for a period of time $T_2$ determined by a capacitor C3 and a resistor $R_{40}$ immediately after a contact $S_1$, $S_2$, $S_3$, or $S_4$ is closed, in order to cancel the voltage generated at the start of the motor operation. As indicated by the broken line in FIG. 4(D) and (E), the output waveform is pulled low from the start until the period $T_2$ elapses.

The non-inverting adder/amplifier circuit 32 delivers an output voltage which is the sum of the output voltage from the delay amplifier circuit 30 and a voltage determined by $\{R8/(R7+R8)\} \cdot V_{IGN}$. The output waveform from the circuit 32 is indicated by the solid line in FIG. 4(D) and (E).

The comparator 33 compares the output voltage from the real time circuit 29 and canceling circuit 31 with the output voltage from the adder/amplifier circuit 32 to determine whether the motor 26 has been accidentally locked or not.

That is, the voltage waveform corresponding to the current in the motor 26 is delayed by a period $T_1$ by means of the delay amplifier circuit 30 as mentioned above. The voltage determined by $(R8/R7+R8) \cdot V_{IGN}$ is added to the delayed waveform by the adder/amplifier circuit 32, and the resulting voltage is applied to the negative input terminal of the comparator 33. The real-time voltage corresponding to the current feeding through the motor 26 is reduced by the transistor TR15 from the start of the motor operation until the period $T_2$ passes. This real-time voltage is then applied to the positive input terminal. In FIG. 4(D) and (E), the solid line is the delayed waveform appearing at point D (the negative input terminal) in FIG. 3. The broken line is the waveform appearing at point E (the positive input terminal) in FIG. 3. For convenience, these two waveforms are shown in overlapped relation. Thus, the comparator 33 compares the voltage corresponding to the current now applied to the motor with the voltage which lags this voltage by the period $T_1$ and to which the voltage determined by $\{R8/(R7+R8)\} \cdot V_{IGN}$ is added. When the voltage corresponding to the real-time current is lower than the lagging voltage, the output from the comparator 33 is kept in low condition. However, if the real-time voltage exceeds the latter, the output from the comparator goes high at the instant of X. At this time, the motor 26 is judged to be locked.

The manner in which the window glass is moved up or down is now described by referring to FIG. 1. The common point $S_0$ of the switch is connected to the positive terminal of the battery installed in the automobile. Also shown are a contact $S_1$ for manual elevation of the window glass, a contact $S_3$ for manual lowering of the glass, a contact $S_2$ for automatic elevation, and a contact $S_4$ for automatic lowering. When the contact $S_1$ for manual elevation is connected with the common point $S_0$, a transistor TR(B1) is biased into conduction to permit a current to flow into a relay which shifts contact M1 to drive the motor in forward rotation. Then, the motor 26 is driven to move up the window glass (not shown). At the same time, a transistor TR(D1) turns on, applying a positive potential to the emitter of a transistor TR(D2).

If a hand or the neck of a person or other foreign object should be sandwiched between the glass and the frame during the upward movement of the glass, the aforementioned detector circuit 22 detects this condition, and produces a signal, which then carries a transistor TR(A1) into conduction to thereby reduce the voltage applied to the base of the transistor TR(D2). This turns the transistor TR(D2) on and, at the same time, a positive voltage is applied to a transistor TR(D3) via the position detector switch SW1, thus driving the transistor TR(D3) into conduction. The voltage to the base of the transistor TR(B1) therefore falls to ground level, taking this transistor out of conduction. Then, the relay coil $L_1$ is de-energized, stopping the motor 26. As a result, the upward movement of the glass stops.

Just when the motor 26 comes to a halt, the relay coil $L_2$ of the coil which is designed to rotate the motor 26 in the direction to lower the glass is supplied with an electric current which shifts contact M2 to drive the motor in reverse rotation. Thus, the motor 26 is turned in the opposite direction, so that the downward movement of the glass is immediately initiated. Therefore, where the contacts $S_1$ is kept depressed and maintained in contact with the common point $S_0$, if a foreign object is sandwiched between the glass and the frame, the detector circuit 22 detects this condition. The resulting signal immediately reverses the motor 26. Consequently, the glass is lowered safely.

When the contact $S_2$ for automatic elevation of the glass is connected with the common contact $S_0$, a transistor TR(B2) turns on, energizing the relay coil $L_1$. Then, the motor 26 is started and, at the same time, transistors TR(C1) and TR(C2) are driven into conduction. This causes the circuit to latch and so the coil $L_1$ is maintained energized, thus permitting the upward movement of the glass until it bears against the frame. If a foreign object should be sandwiched between the glass and the frame during the upward movement of the glass, the detector circuit 22 detects it, taking the transistor TR(C1) out of conduction. This de-energizes the relay coil $L_1$ to thereby stop the motor 26. Immediately after the motor 26 comes to a halt, it is reversed in the same manner as the foregoing case.

The position detector switch SW1 is so disposed that a portion of the window glass makes contact with the switch SW1 when the glass arrives at a position close to the frame at which a human finger or other foreign object cannot be sandwiched between them. The switch SW1 is composed of normally closed contacts and so the switch SW1 is opened immediately before the glass bears against the frame. Thus, the transistor TR(D2) is not conducting, de-energizing the coil $L_2$. Then, the glass abuts against the frame and comes to a halt.

In case where a foreign object is sandwiched between the glass and the frame while the contact $S_2$ is kept connected with the common point $S_0$, the detector switch SW1 is closed. Therefore, the output signal from the detector circuit 22 brings the potential applied to the base of the transistor TR(B2) to ground level, carrying this transistor out of conduction. Then, the current flowing into the coil $L_1$ for upward movement is cut off and, at the same time, the coil $L_2$ for downward movement is energized to reverse the motor 26, thus lowering the glass. Consequently, safety is secured even if the contact $S_2$ is maintained depressed in contact with the common contact $S_0$.

When the contact $S_3$ for manual lowering is connected with the common contact $S_0$, the motor 26 is rotated in the direction to lower the glass, by the action of transistors TR(B3), TR(C3), and TR(C4). Similarly, when the contact $S_4$ for automatic lowering is connected with the contact $S_0$, the motor is rotated to move the glass downwardly, by the action of transistors TR(B4), TR(C3), and TR(C4). When the glass arrives at its lowermost position, the output signal from the detector circuit 22 turns the transistor TR(C3) off, stopping the downward movement of the glass.

In the above embodiment, the detector means acts to detects the condition in which a foreign object is sandwiched between the glass and the frame during upward or downward movement of the glass. The detector means has the sensor means for measuring the characteristics of the motor that drives the glass and the comparator means for comparing characteristics of the motor. That is, the comparator means compares the motor characteristic measured by the sensor means with the motor characteristic measured a given time earlier. If the deviation of the result of the comparison exceeds a predetermined value, a signal is produced indicating that a foreign object has been sandwiched. This permits the motor load to be monitored without being almost affected by external conditions, including the degree of creakiness of the frame, variations of the ambient temperature, and voltage drop of the battery installed in the automatile due to discharge. Therefore, the condition in which an object is held by the window glass can be rapidly detected.

Although the motor characteristics have been the voltages corresponding to the currents applied to the motor in the above embodiment, the present invention is not limited to this. For example, it is possible to measure the rotational frequency of the motor to sense whether the motor has been locked or not. Further, the invention is not limited to the analog circuit. configuration as shown and described in the previous embodiment. For instance, a microcomputer may be employed to detect the locking of the motor for controlling the upward and downward movements of the glass.

As described thus far, the novel device is equipped with the means for reversing the motor that acts to elevate or lower the glass in accordance with the output signal from the detector means even if any one of the contacts is maintained in contact with the common contact as by being kept depressed. This eliminates the possibility that a dangerous situation takes place even when one of the contacts is kept depressed, unlike the prior art switch.

It is to be noted that the aforementioned reversing circuit 23 may be omitted from the novel automatic window regulator device. In this case, during upward movement of the glass, i.e., the transistor TR(C1) is conducting, the output signal from the detector circuit 22 drives the transistor TR(A1) into conduction. Then, the potential to the transistor TR(C1) is reduced via the diode D(C1), carrying it out of conduction. Thus, the motor 26 is stopped, and the upward movement of the glass ceases. Consequently, the novel automatic window regulator device is capable of stopping the rotation of the motor even if the reversing circuit is emitted from it.

What is claimed is:

1. In a safety device for an automatic window regulator of the type having means for driving a motor for opening or closing a window in a frame, detector means for detecting a locked condition of the motor when a foreign object is caught between the window and the frame, and stopping means for stopping the motor from closing the window in response to a detection signal from the detector means, the improvement wherein said detector means includes a sensor for detecting a voltage across said motor during driving of said motor, a time delay and adder circuit for generating a lagging signal representing the voltage across said motor shifted by a predetermined time delay and having a predetermined voltage increment added thereto, and a comparator for comparing a voltage corresponding to the current actually driving said motor with said lagging signal and for providing a detection signal when said voltage corresponding to said current exceeds said lagging signal.

2. An automatic window regulator device as set forth in claim 1, further comprising a latching circuit inserted between the detector means and the motor for maintaining the motor energized, and wherein the detector circuit is connected to the latching circuit to make the latching circuit inoperative when the motor is locked.

3. An automatic window regulator device as set forth in claim 1, wherein the window glass is a door glass of an automobile.

4. A safety device for an automatic window regulator according to claim 1, wherein said stopping means further includes means for reversing the rotation of the motor to open the window after stopping the motor from closing the window in response to said detection signal.

* * * * *